US012576749B2

(12) United States Patent
    Ekström

(10) Patent No.:    US 12,576,749 B2
(45) Date of Patent:     Mar. 17, 2026

(54) BATTERY CONTROL WITH DUAL BROADCAST

(71) Applicant: Volvo Car Corporation, Gothenburg (SE)

(72) Inventor: Markus Ekström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 26 days.

(21) Appl. No.: 18/694,928

(22) PCT Filed: Sep. 22, 2022

(86) PCT No.: PCT/EP2022/076427
    § 371 (c)(1),
    (2) Date: Mar. 22, 2024

(87) PCT Pub. No.: WO2023/046857
    PCT Pub. Date: Mar. 30, 2023

(65) Prior Publication Data
    US 2024/0336161 A1     Oct. 10, 2024

Related U.S. Application Data

(60) Provisional application No. 63/247,468, filed on Sep. 23, 2021.

(51) Int. Cl.
    *B60L 50/64*        (2019.01)
    *B60L 58/18*        (2019.01)
    (Continued)

(52) U.S. Cl.
    CPC .............. *B60L 58/18* (2019.02); *B60L 50/64* (2019.02); *H01M 10/425* (2013.01); *H01M 50/51* (2021.01); *H01M 2220/20* (2013.01)

(58) Field of Classification Search
    CPC .......... B60L 58/18; B60L 50/64; B60L 58/21; B60L 50/66; B60L 58/12;
    (Continued)

(56) References Cited

U.S. PATENT DOCUMENTS

| | | | |
|---|---|---|---|
| 2004/0081193 A1* | 4/2004 | Forest ................. | H04L 12/4035 370/458 |
| 2012/0105001 A1* | 5/2012 | Gallegos ................. | B60L 53/66 320/109 |
| 2021/0151728 A1* | 5/2021 | Hinterberger ....... | H01M 10/425 |

FOREIGN PATENT DOCUMENTS

| | | |
|---|---|---|
| CN | 104957675 A | 9/2015 |
| DE | 102011079365 A1 | 1/2013 |

(Continued)

OTHER PUBLICATIONS

Search report issued for International Application No. PCT/EP2022/076427, mailed on Feb. 7, 2023, 3 pages.

(Continued)

*Primary Examiner* — Elim Ortiz
(74) *Attorney, Agent, or Firm* — Raj S. Davé; Davé Law Group, LLC

(57) ABSTRACT

The present disclosure relates to a battery arrangement. The battery arrangement including a plurality of battery cells, a plurality of battery cell controllers forming a plurality of slave nodes, wherein each battery cell controller of the battery cell controllers is connected to at least one terminal associated with at least one battery cell of the battery cells and includes at least a power electronics arrangement for selectively connecting or disconnecting with the at least one terminal. The battery cell arrangement further includes a master node broadcasting a control information message to the slave nodes, wherein the control information message enables each of the slave nodes to generate an electrical signal with one or more characteristics based on the control (Continued)

information message, by controlling its power electronics arrangement.

19 Claims, 5 Drawing Sheets

(51) Int. Cl.
    *H01M 10/42*     (2006.01)
    *H01M 50/51*     (2021.01)
(58) Field of Classification Search
    CPC .......... B60L 2240/547; B60L 2260/42; H01M
           10/425; H01M 50/51; H01M 2220/20;
           H01M 50/249; H01M 2010/4271; H01M
           2010/4278; Y02T 10/70; B60Y 2200/91;
                 B60Y 2200/92; B60Y 2400/112
    See application file for complete search history.

(56)                 References Cited

FOREIGN PATENT DOCUMENTS

| | | |
|---|---|---|
| KR | 20190005407 A | 1/2019 |
| WO | 2016020154 A1 | 5/2021 |

OTHER PUBLICATIONS

Office Action issued for Korean Patent application No. 10-2024-7013464, mailed on Nov. 28, 2025, 14 pages.
Office Action issued for Chines Patent application No. 202211159706.3, mailed on Dec. 11, 2025, 18 pages.

* cited by examiner

BATTERY CONTROL WITH DUAL BROADCAST

CROSS-REFERENCE TO RELATED APPLICATIONS

This application claims the benefit from the PCT Application Number PCT/EP2022/076427, filed on Sep. 22, 2022, which is claiming priority from the U.S. Provisional Application No. 63/247,468, filed on Sep. 23, 2021, and which are hereby incorporated by reference in their entirety.

TECHNICAL FIELD

The present disclosure relates to electric and/or hybrid electric vehicle drive technologies. In particular, the present disclosure relates to a battery arrangement, a method for controlling such a battery arrangement, and a vehicle comprising such a battery arrangement.

BACKGROUND ART

Electro mobility is an increasingly respected part of today's and tomorrow's mobility. For example, in view of regional and/or global climate targets, there is a need for practical and efficient electric drive technologies.

It is known from practical experience that electric drive technology is limited, for example, by the battery arrangements available today. This concerns, for example, limitations given by the complex requirements, e.g., a large number of charging cycles, performance requirements in terms of electrical power output, available capacity, operating conditions, etc.

For example, controlling a battery arrangement sets high requirements if an electric machine is to be operated with it.

SUMMARY

There may, therefore, be a need to provide improved control of a battery arrangement or at least a part thereof.

The object of the present invention is solved by the subject-matter of the appended independent claims, wherein further embodiments are incorporated in the dependent claims.

According to a first aspect, there is provided a battery arrangement for connecting to an electric machine and/or a power supply, comprising:

a number of battery cells, of which a first sub-number connected in series form a first string, a second sub-number connected in series form a second string, and a third sub-number connected in series form a third string, the first string, second string and third string being connectable to the electric machine as one respective phase;

a number of battery cell controllers forming a number of slave nodes, each battery cell controller being connected to at least one terminal of an assigned one of the number of battery cells, and each battery cell controller comprising at least a power electronics arrangement to selectively connect or disconnect the at least one terminal; and a master node, configured to broadcast a control information message to one or more of, multiple of and/or each of the number of slave nodes, the control information message allowing each slave node to control its power electronics arrangement.

In this way, controlling the battery arrangement can be improved. For example, cell voltage verification and further battery arrangement control functions can be improved, thereby improving the overall accuracy of controlling the battery arrangement.

As used herein, batteries, which may be arranged in a battery arrangement or assembly as described herein, in electric vehicles and hybrid vehicles supply the electric motor(s), i.e., the electric machine, with electrical energy, which is converted into mechanical kinetic energy for propulsion.

Further, each one of the number of battery cells, which may also be referred to as battery segments and which may be e.g., of Lithium ion (Li-ion) technology, is a power source in itself. For example, these may also power the battery cell controller.

For example, one or more of and/or each of the number of battery cells board may contain four terminals or output points. Two of these may be alternating current (AC) terminals or power points and two may be isolated direct current (DC) terminals or power points. The battery cell connection to the outside world may be done through these points.

When a battery cell is connected to one or more other battery cells, here, the number of battery cell controllers may be made between the two cells AC points, and not between cell terminals as in conventional technologies. Since the battery cell itself can internally, i.e., by the battery cell controller connected thereto, control if and how it should be connected to the AC-terminals, this allows for the battery cell to disconnect itself from the main battery without affecting the complete battery arrangement or pack performance significantly. This mode may also be referred to as bypass mode and may be default. The battery cell controller may be designed to be one per battery cell or even one per two or more battery cells.

In electric and hybrid vehicles, the battery cell controller and/or the power electronics, among other things, control the electric drive and establish a connection between the electric motor and the, e.g., high-voltage, battery and/or individual battery cells.

Further, as used herein, a master node may be configured to connect to each one of the number of battery cell controllers, which may also be referred to as a number of slave nodes. The master node may be configured to broadcast information or data, e.g., transmitted as a message, which may be of a predefined format, to each one of the slave nodes. Likewise, the each slave node, or one slave node of each string, may be configured to transmit information or data, e.g., in a message of a predefined format, to the master node and/or to one or more of the other slave nodes. Further, the one or more, or even each of the, slave nodes may be configured to broadcast information or data within the system of the battery arrangement. For example, the master node may be configured, e.g., by a communication interface, to connect to the one or more slave nodes by wireless communication or another galvanic isolated communication.

Further, the master node may be configured to generate a virtual sine wave as control information to be used by the slave nodes for controlling the battery cells, e.g., to be switched on and off, etc. The virtual sine wave is used by the slave nodes to generate a corresponding signal by switching the batteries on and off.

Further, for example, there may be a master node/slave node work split, providing distributed feedback control. The master node may be configured to request one or more of e.g., modulator phase current, phase angle, present cycle time and resolver angle every millisecond (ms). The slave nodes may run with a closed loop phase current control of about 10 kHz and may comprise an on-board current sensor to achieve desired phase current, and may detect or determine cycle time, current set point and resolver angle updated every millisecond (ms). As an option, in order to increase control performance, the slave node may further measure a phase between current and voltage to adjust its own phase. The slave node may further comprise an internal slave current control.

Optionally, one or more of and/or each of the number of slave nodes may be further configured to control the slave node's power electronics arrangement to generate, within or along the respective string, an electrical signal configured to provide the one respective phase in accordance with the control information message.

Optionally, the electrical signal may be a sine shaped voltage with a phase in accordance with the control information message.

Optionally, the power electronics arrangement may comprise a number of power switches configured to selectively connect or disconnect the respective sub-number of battery cells based on the control information message.

Optionally, in which is defined a clocked update event may have specified time interval between each clocked update event, in which time interval bidirectional data transmission between the master node and the number of slave nodes is scheduled.

Optionally, the data transmission may be scheduled to allow broadcasting the control information message by the master node and providing at string-specific feedback information of each one of the first string, second string and third string from at least one slave node of each string to the master node, within the specified time interval.

Optionally, control information included in the broadcasted control information message may be defined to be valid from one clocked update event to the next and to be used by the number of slave nodes from the one clocked update event until the next clocked update event.

Optionally, the master node may be further configured to broadcast the control information message upon or after the clocked update event in a scheduled manner.

Optionally, the master node may be further configured to receive for each clocked update event a vehicle propulsion request signal associated with the electric machine and/or the power supply, and the master node being further configured to determine the control information or updated control information to be broadcasted based on at least the received vehicle propulsion request signal. This request may be sent from a vehicle controller controlling e.g., the drive and/or propulsion of the vehicle.

Optionally, the clocked update event may be configured to trigger the number of slave nodes to acquire at least one battery cell parameter at a common timepoint, the number of slave nodes being further configured to provide the acquired at least one battery cell parameter to the master node and/or the one or more other of the number of slave nodes within the specified time interval.

Optionally, an interval between each clocked update event may be in the millisecond range.

Optionally, the master node may be further configured to connect to each of the first string, second string and third string via a wireless communication interface or other galvanic isolated communication method.

Optionally, the number of slave nodes may be further configured to connect to the master node via a wireless communication interface or other galvanic isolated communication method.

Optionally, the number of slave nodes each may have an assigned identifier to be identified and/or addressed by the master node.

Optionally, the number of slave nodes each may have an assigned Media-Access-Control, MAC, address to be identified and/or addressed by the master node.

Optionally, the power electronics arrangement of each of the number of busbar cell connectors may comprise a H-bridge comprising a number of power switches configured to selectively connect to the corresponding battery cell.

Optionally, the master node may be further configured to receive battery cell parameter information from each of the number of slaves.

Optionally, each of the number of slave nodes may be further configured to send battery cell parameter information upon an update event.

In a second aspect, there is provided a vehicle, comprising:

an electric machine; and a battery arrangement according to the first aspect, the battery arrangement being connected to the electric machine.

Optionally, the vehicle further comprising a power supply interface, the battery arrangement being further connected to the power supply interface.

In a third aspect, there is provided a method for controlling a battery arrangement comprising a number of battery cells, of which a first sub-number connected in series form a first string, a second sub-number connected in series form a second string, and a third sub-number connected in series form a third string, the first string, second string and third string being connectable to the electric machine as one respective phase, a number of battery cell controllers forming a number of slave nodes, each battery cell controller connecting at least one terminal of the number of battery cells within one of the strings, and a master node, the method comprising:

broadcasting a control information message to one or more of, multiple of and/or each of the number of slave nodes, the control information message allows each slave node to control its power electronics arrangement.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to a further aspect, there is provided a computer program element, which, when being executed by a processing unit, is adapted to perform the method steps of the first aspect.

According to a further aspect, there is provided a computer readable medium having stored the computer program element of the preceding aspect.

It should be noted that the above examples may be combined with each other irrespective of the aspect involved. Accordingly, the method may be combined with structural features and, likewise, the apparatus and the system may be combined with features described above with regard to the method.

These and other aspects of the present invention will become apparent from and elucidated with reference to the embodiments described hereinafter.

BRIEF DESCRIPTION OF DRAWINGS

Exemplary embodiments of the invention will be described in the following with reference to the following drawings.

FIG. 6 shows in a flow chart a method for deheating a battery cell controller of a battery arrangement for connecting to an electric machine and/or a power supply.

FIG. 7 shows in a schematic top view a battery arrangement for connecting to an electric machine and/or a power supply.

The figures are merely schematic representations and serve only to illustrate embodiments of the invention. Identical or equivalent elements are in principle provided with the same reference signs.

DESCRIPTION OF EMBODIMENTS

Figures 1, 2A:
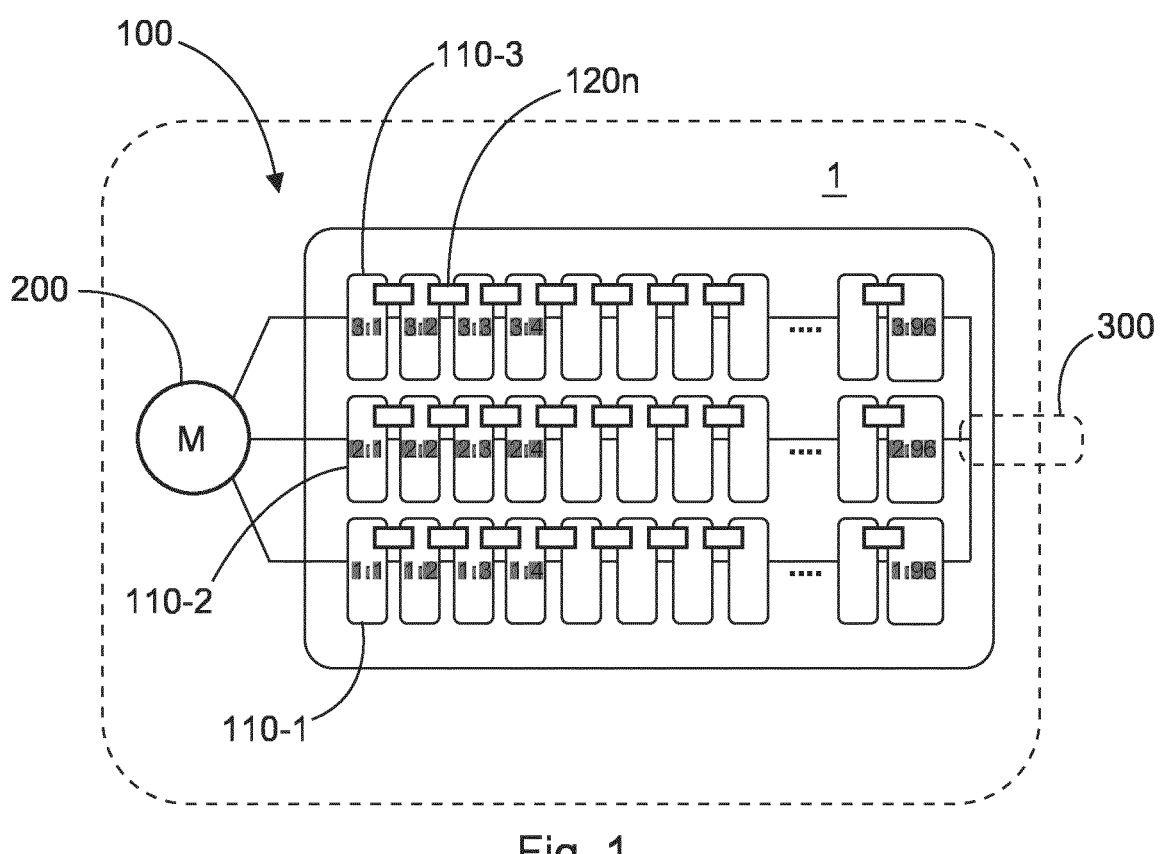
FIG. 1 shows in a schematic top view a battery arrangement for connecting to an electric machine and/or a power supply.
FIG. 2A shows in a perspective view a battery cell controller designed to be one per battery cell.

FIG. 1 shows a battery arrangement 100 for connecting to an electric machine 200 and/or a power supply 300. In FIG. 1, the connection(s) between the battery arrangement 100 and the electric machine 200 is (are) indicated by solid lines. The electric machine 200 is a e.g., three-phase electric motor, which is, for example, part of a vehicle 1 or the vehicle's powertrain or drive. The battery arrangement 100 is configured to provide electric energy to the electric machine 200 and/or the power supply and/or to be charged via the power supply.

The battery arrangement 100 comprises a number of battery cells 110, which are connected in series in three strings, providing three phases to run the electric machine 200, i.e., each string forms one phase if connected to the electric machine 200. The three strings are indicated in FIG. 1 by the addition of the reference sign 110 with −1, −2 and −3. In other words, as shown in FIG. 1, a first sub-number of the battery cells 110 connected in series form a first string, a second sub-number of the battery cells 110 connected in series form a second string, and a third sub-number of the battery cells 110 connected in series form a third string, the first string, second string and third string being connectable to the electric machine 200 as one respective phase. The number of battery cells is not limited herein and may be any suitable number greater than one.

Further, if the battery cells 110 are connected in a suitable number to reach a desired voltage, the battery arrangement 100 may also be connected to the power supply, e.g., a mains with 50 Hz or the like, and the battery cells 110 may be charged by the power supply or may supply the net with energy from the battery cells 110.

The battery arrangement 100 further comprises a number of battery cell controllers 120, each being connectable or connected to a terminal of at least one of the number of battery cells 110 within one string. The number of battery cell controllers 120 may also be referred to as a number of nodes, i.e., a number of slave nodes, as will be explained in more detail further below.

Figure 2B:
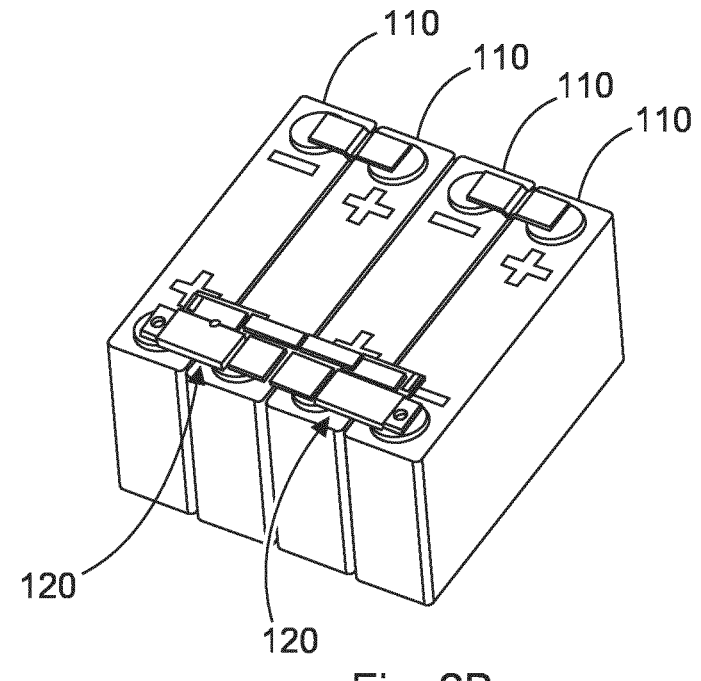
FIG. 2B shows in a perspective view a battery cell controller designed to be one per two or more battery cells.

Thereby, the battery cell controller 120 may be designed to be one per battery cell 110 as shown in FIG. 2A, or one per two or more battery cells 110 as shown in FIG. 2B. Each of the number of battery cells 110 comprises four terminals or output points. Two of these may be AC terminals or power points and two may be isolated DC terminals or power points, as indicated in FIG. 2A for one electric pole by AC and DC.

Figure 3:
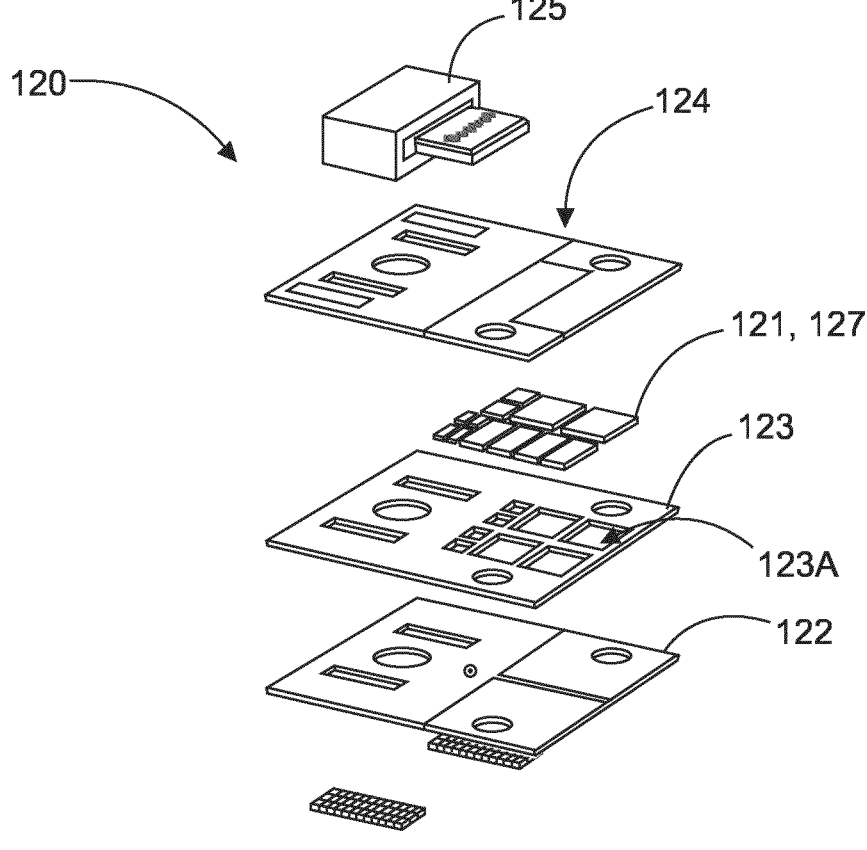
FIG. 3 shows in an exploded view a structure of a battery cell controller.

Now referring to FIG. 3, which shows in an exploded view a structure of the battery cell controller 120. Each battery cell controller 120 comprises a power electronics arrangement 121, which is embedded in a multi-layer structure, which may also be referred to as at least a kind of printed circuit board (PCB) or a composition of several PCB or parts of it.

As shown in FIG. 3, the PCB of the battery cell controller 120 may be formed in multiple layers, a base or first layer 122 may comprise at least a section made of a metal core or metal back and may be configured, in FIG. 3 by respective through holes, to engage the respective terminal of the battery cell 110, thereby forming at least a part of a busbar. Further, an intermediate layer 123 comprises a number of through holes 123A, forming a frame structure, in which the power electronics arrangement 121 is held in place. Furthermore, a top or second layer 124 comprises at least a section made of the metal core or metal back and is configured, in FIG. 3 by respective through holes, to engage the respective terminal, thereby forming at least a part of a busbar. For example, the first layer 122 may be formed as a PCB layer where e.g., two busbar parts may be made out of metal backed PCB. The intermediate layer may be formed from e.g., a standard PCB comprising one or more through holes in place to locate the embedded power electronics arrangement 121. On top of the layer, a controller unit or chip 125 and/or a transformer core may be arranged.

The power electronics arrangement 121 comprises a number of power switches, such as FET, MOSFET, or the like. The second layer may be formed from a standard PCB as well as two metal backed PCB.

Still referring to FIG. 3, the power electronics arrangement 121 may be arranged between the base or first layer 122 and the top or second layer 124, thereby contacting the conductive material of at least one of the layers.

Figure 4:
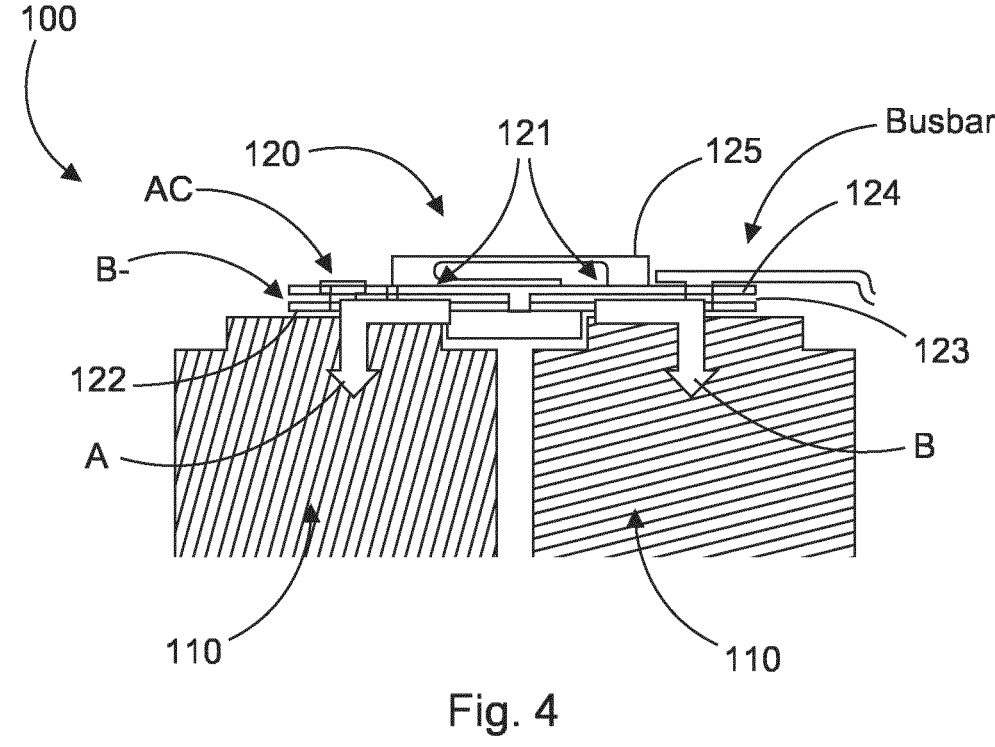
FIG. 4 shows in a cross-sectional view a part of the battery arrangement and particularly of the battery cell controller.

FIG. 4 shows in a cross-sectional view a part of the battery arrangement 100 and particularly of the battery cell controller 120. As indicated in FIG. 4 by arrows A and B, each battery cell controller 120 comprises or forms a first thermal conduction path extending from the power electronics arrangement via the terminal to a body of the respective battery cell 110. Thereby, the power electronics arrangement 121 contacts the respective terminal via a conductive material, i.e., the above metal core or metal back, integrated in the number of battery cell controllers 120, as explained above.

Figure 5:
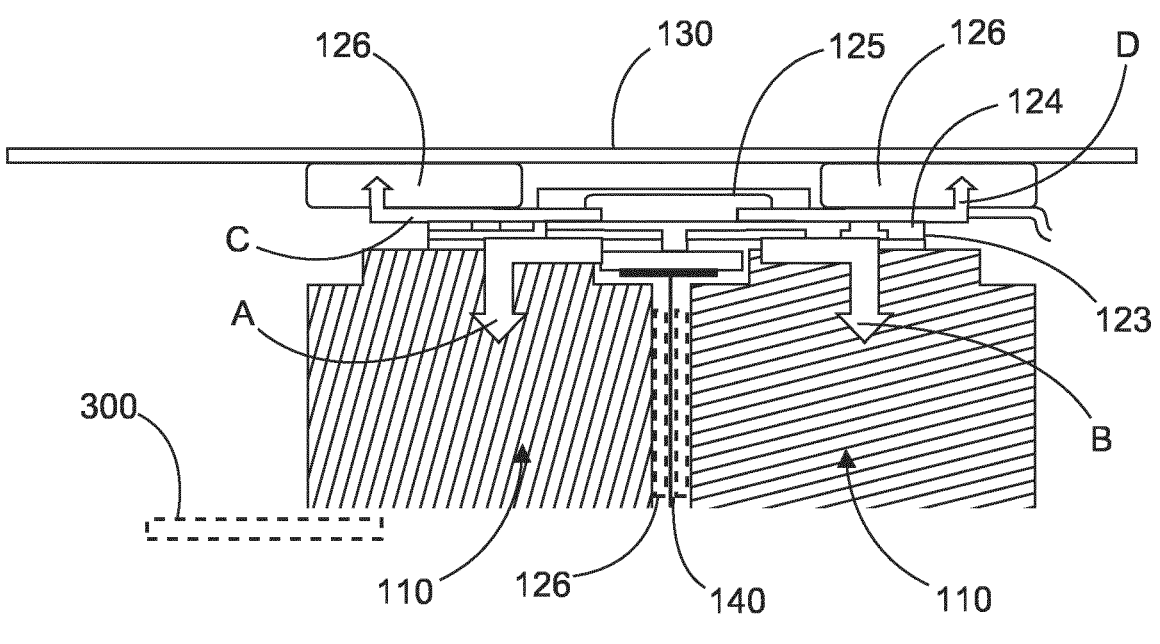
FIG. 5 shows in a cross-sectional view a part of the battery arrangement and particularly of the battery cell controller.

FIG. 5 shows in a cross-section view a part of the battery arrangement 100 and particularly of the battery cell controller 120. As indicated in FIG. 5 by arrows C and D, the number of battery cell controllers 120 further comprises or forms a second thermal conduction path extending from the power electronics arrangement 121 via the terminal and/or the body of the battery cell 110 to a casing 130 of the respective battery cell 110 and/or the battery arrangement 100. As shown, the casing 130 covers the number of battery cell controllers 120 and contacts a top side of the at least a part of the number of battery cell controllers 120. Further, the casing 130 contacts the number of battery cell controllers 120 via a thermal interface material (TIM) 126, being arranged between at least a part of the number of battery cell controllers and the casing, the thermal interface material being further in contact with the battery cell controller. For example, the thermal interface material 126 may be formed as a pad contacting each of the number of battery cell controllers 120 and the casing 130 two-dimensionally. Further, by way of example, the casing 130 may have an outer surface exposed to ambient air of the battery arrangement 100. Further, the casing 130 may be made of aluminum or an aluminum alloy.

Alternatively or additionally, as indicated in FIG. 5 by a dashed line, the battery arrangement 100 may further comprise a third thermal conduction path arranged and/or formed between the number of battery cells 100 by a heat conducting blade 140 that contacts the body of at least a part of the number of battery cells 100 and/or the number of battery cell controllers 120, and that is exposed to ambient air with respect to the battery arrangement 100. to claim 16, the heat conducting blade being coupled to the body of the number of battery cells and/or the number of battery cell controllers by interconnecting a thermal interface material 126 there between.

In a non-illustrated example, the battery arrangement further comprises a fourth thermal conduction path formed by a number of rails running along of at least a part of the number of battery cell controllers.

Optionally, each of the number of battery cell controllers 120 may be materially bonded to the terminal of the battery cell 110. Alternatively, the connection may be made of a screw connection. For example, the material bonding being formed by a welded bond. Further, the material bonding being formed by laser welding.

Further optionally, the number of battery cells 110 may be connected to at least one refrigerant and/or coolant circuit 400 (indicated in FIG. 5 by dashed lines for only one battery cell 100) through which thermal energy given off from the power electronics arrangement 121 to the body of the number of battery cells 110 can be dissipated.

Figures 6, 7:
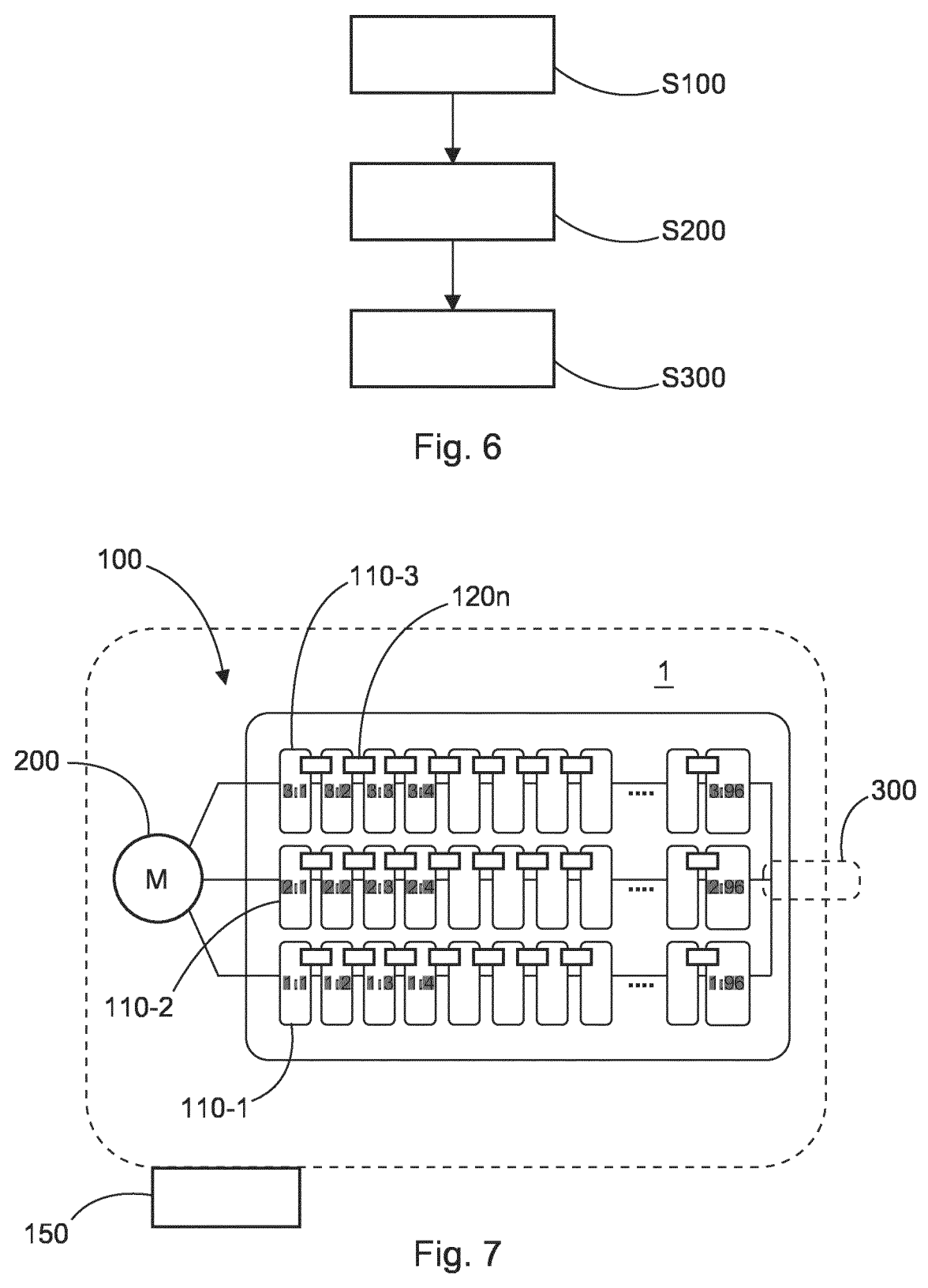

Referring to FIG. 6, which shows a flow chart, a method for deheating a battery cell controller 120 of a battery arrangement 100 (such as described above) for connecting to an electric machine 200 and/or a power supply 300, may be performed as described below.

In a step S100, there is provided a number of battery cells 100, of which a first sub-number connected in series form a first string, a second sub-number connected in series form a second string, and a third sub-number connected in series form a third string, the first string, second string and third string being connectable to the electric machine as one respective phase.

In a step S200, there is provided a number of battery cell controllers 120, each battery cell controller 120 comprising at least a power electronics arrangement 121.

In a step S300, each of the number of battery cell controllers is connected to a terminal of at least one of the number of battery cells 110 within one string, each battery cell controller 120 comprising or forming a first thermal conduction path extending from the power electronics arrangement 121 via the terminal to a body of the respective battery cell 110.

Now referring to FIG. 7, which shows the battery arrangement 100 similarly to FIG. 1, the battery arrangement 100 comprises the number of battery cells 110 forming three strings, i.e., three phases, to be connected to the electric machine 200 and/or the power supply 300. Further, the battery arrangement 100 comprises the number of battery cell controllers 120, wherein these further form a number of slave nodes. Thereby, each battery cell controller 120 connects at least one terminal of the number of battery cells within one of the strings, each battery cell controller 120 comprises the power electronics arrangement 121 and a sensor 127 (see e.g., FIG. 3) configured to acquire at least one battery cell parameter. Further, the battery arrangement 100 comprises a master node 150, configured to connect to each of the first string, second string and third string and/or to each of the slave nodes, i.e., the number of battery cell controllers 120. Further, the master node is configured to acquire a total parameter of a respective one of the first string, second string and third string. Thereby, the battery arrangement 100 is configured to verify the at least one battery cell parameter acquired and the total parameter acquired against each other. The total parameter may be, for example, the total voltage of the respective string, a current, a In other words, the master node 150 is configured to measure and/or determine the total parameter, e.g., total voltage, its phase etc., total current, state of charge (SOC), temperature, etc., of each string. This total parameter can be verified with the cell parameter, e.g., voltage, measurement by turning on one slave node, which measures the cell parameter, e.g., total voltage, its phase etc., total current, SOC, temperature, etc., at a time and compare values from slave node with the total value measured by the master node. For example, this could be performed during start up, e.g., startup of the battery arrangement 100 and/or the vehicle 1. Further, for example, in DC operation, the values from the slave nodes may be summed up and compared with the master's measured value. In AC operation, a stable condition may be controlled for a time interval, e.g., about 100 milliseconds, to collect data from the slave nodes.

Further, the battery arrangement 100 may be further configured to verify the at least one battery cell parameter acquired, and the total parameter acquired against each other by controlling only one single slave node to be activated at one time and acquiring the at least one battery cell parameter of the correspondingly activated slave node and/or battery cell.

Furthermore, the battery arrangement may be further configured to activate each of the number of slave nodes one by one, acquire the respective at least one battery cell parameter and sum them up and then verify with the total parameter acquired.

Still referring to FIG. 7, which shows the battery arrangement 100 similarly to FIG. 1, the battery arrangement 100 comprises the number of battery cells 110 forming three strings, i.e., three phases, to be connected to the electric machine 200 and/or the power supply 300. Further, the battery arrangement 100 comprises the number of battery cell controllers 120, wherein these further form a number of slave nodes. Thereby, each battery cell controller 120 connects at least one terminal of the number of battery cells within one of the strings, each battery cell controller 120 comprises the power electronics arrangement. Further, the battery arrangement 100 comprises a master node 150, configured to broadcast a control information message to each of the number of slave nodes, the control information message allows each slave node to control its power electronics arrangement 121.

In other words, the battery arrangement 100 comprises the master node 150 that is configured to dictate a behavior of the system, i.e., the battery arrangement 100, and the number of slave nodes, i.e., the battery cell controllers 120, which are mounted directly on the battery cells 110. The slaves know their position in the battery arrangement 100. They receive the broadcasted control information message at the same time or within an agreed time limit. They may be configured to connect and disconnect themselves depending on the control information message, e.g., a modulator angle or the like, included therein. The slaves are connected in the three strings and together they can create three sine shaped voltages, which are controlled to achieve desired phase currents, e.g., a torque. The master node 150 may be configured to generate a virtual sine wave, which may also be referred to as modulator. This is done by broadcasting a propulsion request info with predetermined pace, for example every millisecond. Broadcasting may be done over radio or other galvanic isolated communication method. Since broadcasted transmission delay is well defined and the absolute time is transmitted in the broadcasted message, the complete system will have the same absolute time with an accuracy better than 1 microsecond. The slave nodes may have time slots scheduled to distribute information to the system. The slave nodes broadcast a message in the same manner as the master node 150. In this way, all nodes in the system will get all the information that is flowing in the network. The scheduled slave node response can be made so that three slaves (one from each string) have time to respond between every master transmission. For example, current from each string with the same time stamp is available on the network, enabling to analyze the AC current every millisecond based on an internal current sensors in the slave nodes.

Figure 8:
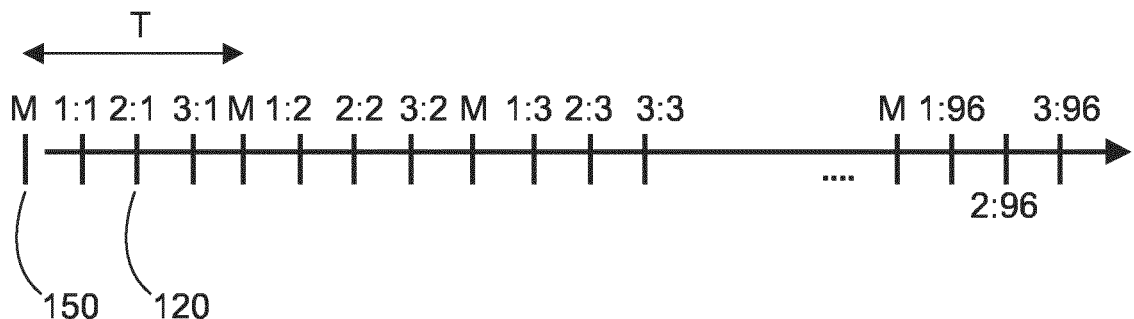
FIG. 8 shows in a timeline the scheduling of multidirectional broadcasting.

FIG. 8 shows in a timeline the scheduling of the multi-directional broadcasting as described above. The time interval T may be in the millisecond or microsecond range, e.g., about 1 ms. M may indicate the master node's 150 transmission, and 1:1, 2:1, 3:1, etc. may indicate the respective time slot of the respective battery cell controller 120, i.e., the slave node, between each broadcasting of the master node 150. As described above, the designation 1:1, 1:2, 1:3 refer to the respective strings of battery cells 110.

In other words, the master node 150 may be configured to generate a virtual sine wave, which is also referred to as the modulator. This may be done by broadcasting propulsion request info with predetermined pace, for example every millisecond. Broadcasting can be done over radio or other galvanic isolated communication method. Since broadcasted transmission delay is well defined and the absolute time is transmitted in the broadcasted message, the complete system, i.e., the battery arrangement 100, will have the same absolute time, e.g., with an accuracy better than 1 microsecond. The slave nodes have time slots scheduled to distribute information to the system. The slave nodes broadcast a message in the same manner as the master node. For example, even all nodes in the system may get all the information that is flowing in the network. The scheduled slave node response can be made so that three slaves (one from each string) have time to respond between every master transmission. For example, a current from each string with the same time stamp is available on the network and it is possible to analyze the AC current every millisecond based on the internal current sensors in the slave nodes.

Figure 9:
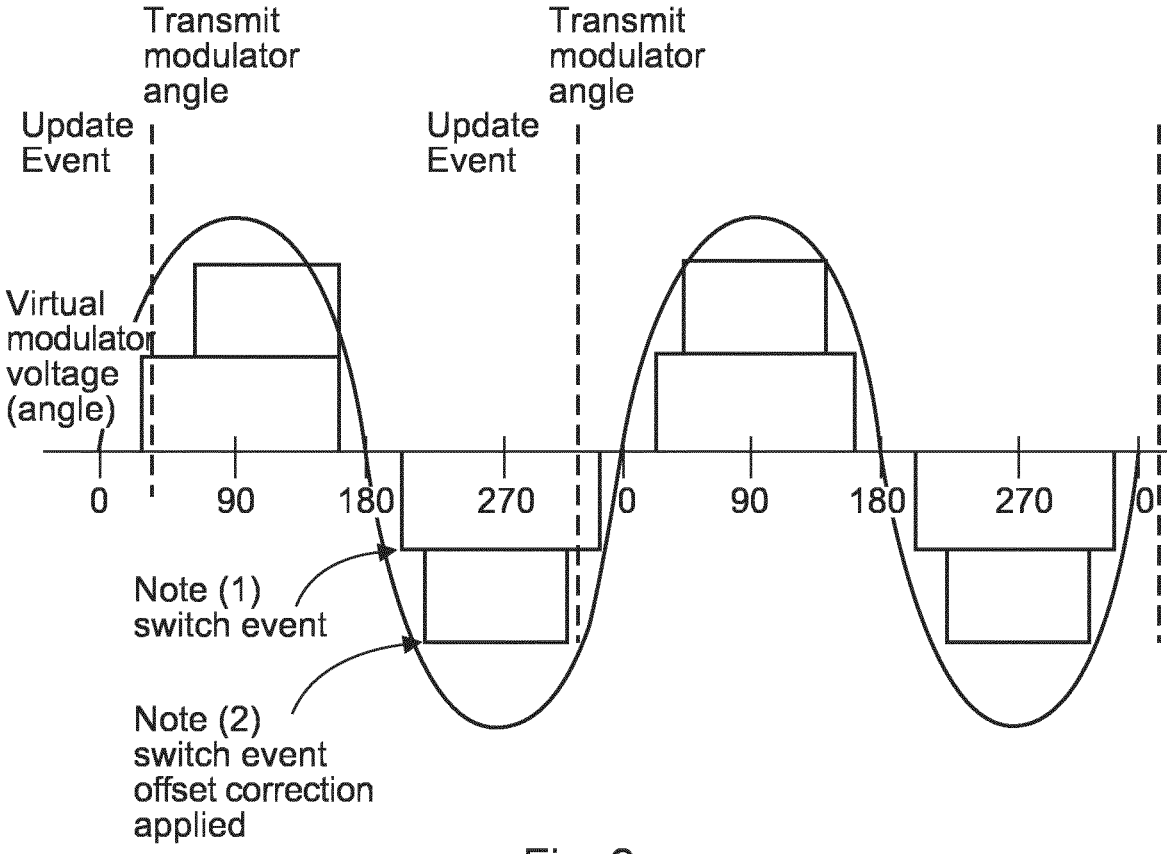
FIG. 9 shows in a timeline tasks of a master node and one or more slave nodes, triggered and/or synchronized by an update event.

Now referring to FIG. 9, which shows in a timeline tasks of a master node and one or more slave nodes, triggered and/or synchronized by an update event. The update events may occur with the above time interval T. The update event is the base for all time synchronized changes in the modulator. The Master node message transmission is scheduled just after update. Then three slave node transmissions are scheduled before next master node's transmission. For example, after the update event, some or all nodes in the battery arrangement may measure a respective current at the same time. The master node may measure resolver angle and may get or determine current modulator angle.

Still referring now to FIG. 9, modulator, i.e., the virtual sine wave generated by the master node 150, is explained in more detail. At every update event the master node 150 may transmit a current modulator angle. The slave nodes, i.e., the battery cell controllers 120, may receive this angle, compare with their own modulator angle and, if deviating, calculate a correction. This is indicated in FIG. 9 by rectangles representing switch-on times of a slave node or a battery cell, respectively, and fit into the virtual modulator voltage (angle) by changing the switching times. The offset of the respective slave node may be applied once to modulator timing at the next switch on event, thereby the modulator is kept in synchronization as absolute timing is synchronized. It is noted that FIG. 9 Figure shows a system with only two slave nodes generating a rather low resolution sine wave. It also shows the virtual sine voltage that the system generates. With a large number of slave nodes, the generated voltage will be very close to true sine shape.

As described above, the virtual sine wave generated by the master node may also be referred to as the modulator. The update event may be regarded as the base for all time synchronized changes in the modulator. The master's node message transmission is scheduled just after the update event. Then, as explained above with reference to FIG. 8, the three slave node transmissions are scheduled before the next master's node transmission.

Other variations to the disclosed examples and/or embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A battery arrangement comprising:
   a plurality of battery cells, of which a first sub-number of
   the battery cells are connected in series to form a first string, a second sub-number of the battery cells are connected in series to form a second string, and a third sub-number of the battery cells are connected in series to form a third string, the first string, the second string, and the third string are connected to a respective phase associated with at least one of an electric machine and a power supply;

a plurality of battery cell controllers forming a plurality of slave nodes, wherein each battery cell controller of the battery cell controllers is connected to at least one terminal associated with at least one battery cell of the battery cells, wherein each of the battery cell controllers comprises at least a power electronics arrangement for selectively connecting or disconnecting with the at least one terminal; and a master node broadcasting a control information message to the slave nodes, wherein the control information message enables each of the slave nodes to generate an electrical signal with one or more characteristics based on the control information message by controlling its power electronics arrangement, and wherein each of the slave nodes is configured to generate the electrical signal with one or more characteristics, within at least one of the first string, the second string, and the third string, wherein the one or more characteristics of the electrical signal comprises a sine shaped signal with a phase based on the control information message; and wherein the battery arrangement is configured to be connected to at least one of the electric machine and the power supply.

2. The battery arrangement of claim 1, wherein the power electronics arrangement comprises a plurality of power switches to selectively connect or disconnect one or more battery cells associated with at least one of the first sub-number of the battery cells, the second sub-number of the battery cells, and the third sub-number of the battery cells, based on the control information message.

3. The battery arrangement of claim 1, further comprising: a clocked update event with a predefined time interval, wherein a bidirectional data transmission between the master node and the slave nodes is scheduled based on the predefined time interval.

4. The battery arrangement of claim 3, wherein the bidirectional data transmission comprises: broadcasting the control information message by the master node to the slave nodes; and providing a string-specific feedback information associated with the first string, the second string, and the third string from at least a first slave node, a second slave node, a third slave node of the slave nodes to the master node, within the predefined time interval, wherein the first slave node is associated with the first string, the second slave node is associated with the second string, and the third slave node is associated with the third string.

5. The battery arrangement of claim 4, wherein a control information in the broadcasted control information message is valid from one clocked update event to a next clocked update event for use by the slave nodes from the one clocked update event to the next clocked update event.

6. The battery arrangement of claim 5, wherein the master node is configured to broadcast the control information message based on at least one of: at the clocked update event and after the clocked update event, in a scheduled manner.

7. The battery arrangement of claim 6, wherein the master node is further configured to:

receive for each of the clocked update event a propulsion request signal associated with at least one of the electric machine and the power supply; and determine, based on at least the received propulsion request signal, to broadcast at least one of: the control information and an updated control information.

8. The battery arrangement of claim 3, wherein the clocked update event triggers the slave nodes to acquire at least one battery cell parameter at a common timepoint, wherein the slave nodes provide the acquired at least one battery cell parameter to at least one of the master node and one or more other slave nodes of the slave nodes based on the predefined time interval.

9. The battery arrangement of claim 5, wherein an interval between the one clocked update event and the next clocked update event is 1 millisecond.

10. The battery arrangement of claim 1, wherein the master node is configured to connect with each of the first string, the second string, and the third string via at least one of: a wireless communication interface and a galvanic isolation method.

11. The battery arrangement of claim 10, wherein the slave nodes are configured to connect to the master node via at least one of: the wireless communication interface and the galvanic isolation method.

12. The battery arrangement of claim 11, wherein each of the slave nodes is assigned with an identifier, wherein the identifier enables the master node to identify each of the slave nodes.

13. The battery arrangement of claim 12, wherein the identifier comprises a Media-Access-Control address.

14. The battery arrangement of claim 1, wherein the power electronics arrangement comprises a plurality of busbar cell connectors, wherein each of the busbar cell connectors comprise a H-bridge comprising a plurality of power switches configured to selectively connect to the battery cells.

15. The battery arrangement of claim 1, wherein the master node is further configured to receive battery cell parameter information from each of the slave nodes.

16. The battery arrangement of claim 15, wherein each of the slave nodes are configured to send the battery cell parameter information based on an update event.

17. A vehicle, comprising:

an electric machine; and a battery arrangement comprising:

a plurality of battery cells, of which a first sub-number of the battery cells are connected in series to form a first string, a second sub-number of the battery cells are connected in series to form a second string, and a third sub-number of the battery cells are connected in series to form a third string, the first string, the second string, and the third string are connected to a respective phase associated with at least one of the electric machine and a power supply;

a plurality of battery cell controllers forming a plurality of slave nodes, wherein each battery cell controller of the battery cell controllers is connected to at least one terminal associated with at least one battery cell of the battery cells, wherein each of the battery cell controllers comprises at least a power electronics arrangement for selectively connecting or disconnecting with the at least one terminal; and a master node broadcasting a control information message to the slave nodes, wherein the control information message enables each of the slave nodes to generate an electrical signal with one or more characteristics based on the control information message by controlling its power electronics arrangement, and wherein each of the slave nodes is configured to generate the electrical signal with one or more characteristics, within at least one of the first string, the second string, and the third string, wherein the one or more characteristics of the electrical signal comprises a sine shaped signal with a phase based on the control information message; and wherein the battery arrangement being connected to the electric machine.

18. The vehicle of claim 17, further comprising a power supply interface, wherein the battery arrangement is connected to the power supply interface.

19. A method comprising:

broadcasting, by a master node, a control information message to a plurality of slave nodes formed by a plurality of battery cell controllers, wherein each of the battery cell controllers comprises a power electronic arrangement, wherein the control information message enables each of the slave nodes to generate an electrical signal with one or more characteristics based on the control information message by controlling its power electronics arrangement, and wherein each of the plurality of slave nodes is configured to generate the electrical signal with one or more characteristics, within at least one of a first string, a second string, and a third string, wherein the one or more characteristics of the electrical signal comprises a sine shaped signal with a phase based on the control information message; and wherein the method is configured for controlling a battery arrangement.

*    *    *    *    *